Figure 1:
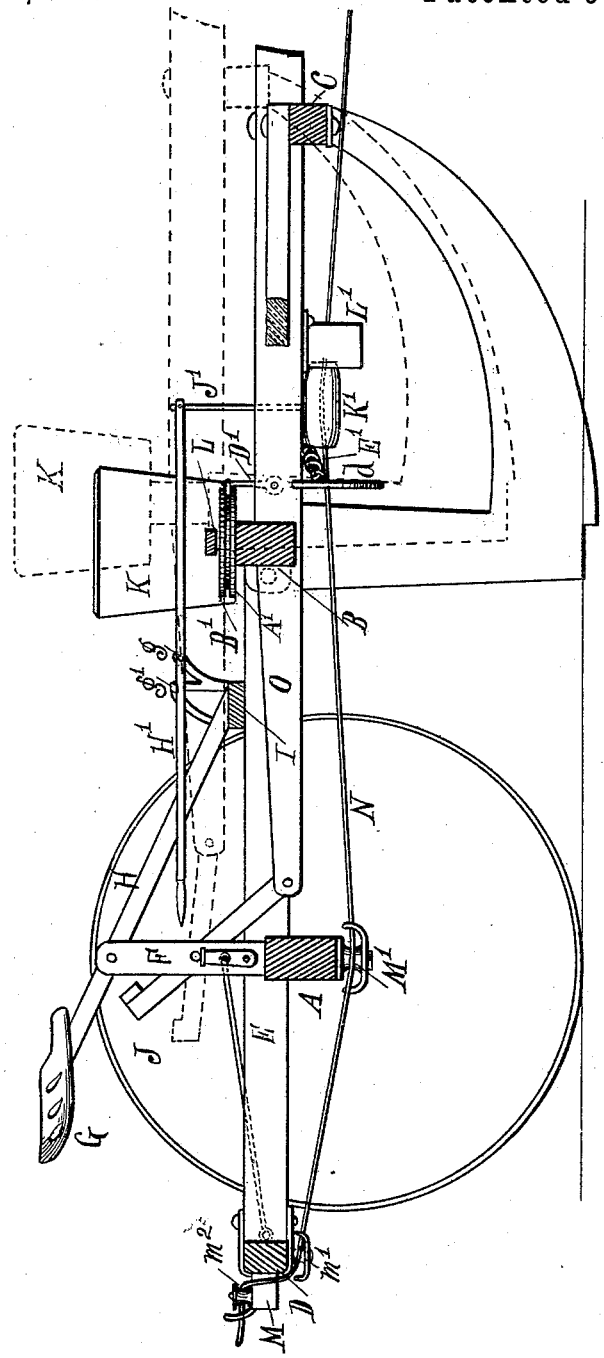

(No Model.) 3 Sheets—Sheet 1.

F. P. RICHARDS.
CENTER MOVEMENT FOR CHECK ROWERS.

No. 466,908. Patented Jan. 12, 1892.

Witnesses.
Inventor.
Frank P. Richards,
by N. DuBois his Atty.

(No Model.) 3 Sheets—Sheet 2.
F. P. RICHARDS.
CENTER MOVEMENT FOR CHECK ROWERS.
No. 466,908. Patented Jan. 12, 1892.
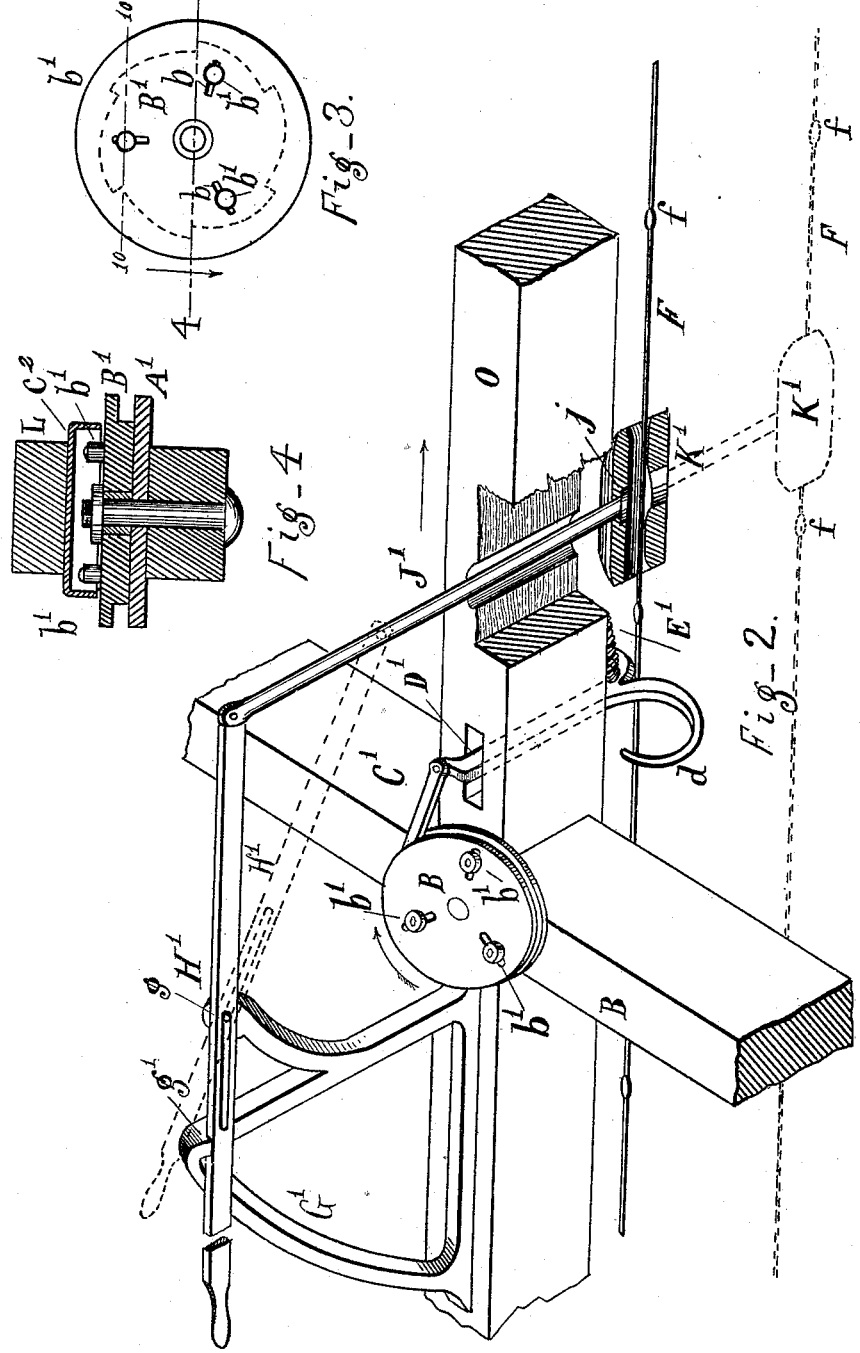
Witnesses
Inventor
Frank P. Richards
by N. DuBois his Atty.

(No Model.)  3 Sheets—Sheet 3.
F. P. RICHARDS.
CENTER MOVEMENT FOR CHECK ROWERS.
No. 466,908. Patented Jan. 12, 1892.
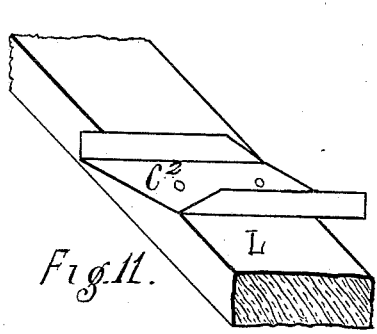
Fig. 11.
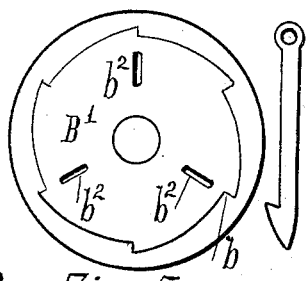
Fig. 5.
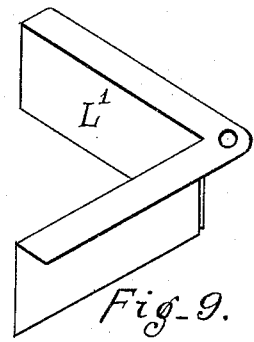
Fig. 9.
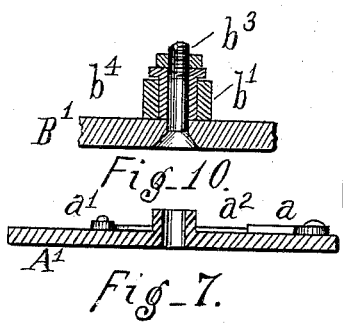
Fig. 10.
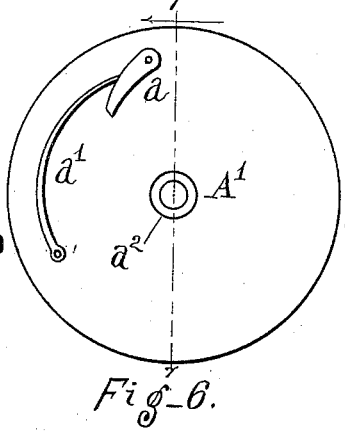
Fig. 7.
Fig. 6.
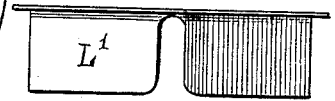
Fig. 8.
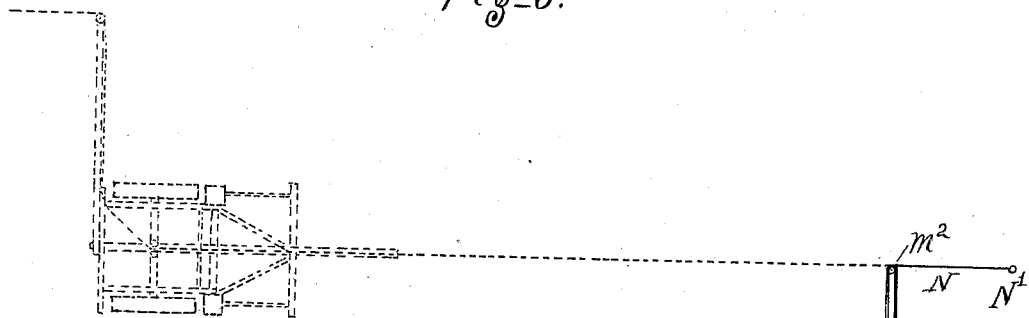
Fig. 12.
Witnesses.
Inventor.
Frank P. Richards,
by N. DuBois his Atty.

United States Patent Office.

FRANK P. RICHARDS, OF EDINBURG, ILLINOIS.

CENTER MOVEMENT FOR CHECK-ROWERS.

SPECIFICATION forming part of Letters Patent No. 466,908, dated January 12, 1892.

Application filed August 12, 1891. Serial No. 402,489. (No model.)

*To all whom it may concern:*

Be it known that I, FRANK P. RICHARDS, a citizen of the United States, residing at Edinburg, in the county of Christian and State of Illinois, have invented a new and useful Center-Movement Check-Rower, of which the following is a specification.

My invention pertains to machines of that class which are used for automatically dropping corn in check-rows so that it may be cultivated in different directions, and the object of my invention is to provide simple and effective means for operating the corn-planter drop and to so arrange the mechanism that the check rope or wire laid across the field may pass under the center of the planter and be used as a guide in driving, thereby making straighter rows than can be otherwise obtained and obviating the side draft on the planter, which is a serious objection to check-rowers as heretofore constructed; also, to provide means whereby the rope carried under the planter may be lowered, so as not to catch on the planter-runners in turning, and also be conveniently raised, so that the knots on the rope will engage with the mechanism which operates the droppers, or lowered to disengage the dropping mechanism; also, to provide a rope-guide under the center of the planter, which in turning at the end of the row will adapt itself to the position of the planter relative to the rope, thereby avoiding dismounting to turn the planter and obviating the necessity for removing the rope from the guide, and again inserting it in the guide every time the planter is turned at the end of the row.

I lay no claim to the corn-planter, and in the drawings show only so much thereof as is necessary to show the connection and operation of my check-rower. Neither do I claim claim the check rope or wire, as both have heretofore been used. My check-rower may be attached to any corn-planter and be operated by any of the check ropes or wires in common use.

My invention is fully illustrated in the accompanying drawings, in which—

Figure 1 is a longitudinal sectional view of a planter, the near wheel and part of the frame-work being removed to show the check-rower in position on the planter. Fig. 2 is a detached sectional view, on an enlarged scale, of a part of the planter tongue and sill, showing the ratchet-plate, the forked lever, the rope-guide, and the lever for raising and lowering the guide in position on the planter. Figs. 3 and 5 are enlarged top and bottom views, respectively, of the ratchet-plate. Fig. 4 is an enlarged transverse section through the segment-plate and the bottom plate in position on the sill. Figs. 6 and 7 are an enlarged top view and transverse section, respectively, of the bottom plate. Figs. 8 and 9 are an enlarged front and side view, respectively, of the fenders. Fig. 10 is an enlarged section through one of the friction-rollers. Fig. 11 is an enlarged detached bottom view of a part of the planter dropper-bar, showing the bearing-plate in position on the bar. Fig. 12 is a diagram showing how the rope passes under the planter and as the planter progresses in one direction is laid across the field in position to serve as a guide in driving and to operate the check-rower as the planter moves in the opposite direction.

Similar letters indicate similar parts in all the views.

The frame-work of the planter as usually constructed consists of two parts, the front or runner part and the back part, supported on wheels. These two parts are usually hinged together and connected by levers, so that the runners may be forced into the ground while planting and raised out of the ground while turning at the end of the row or while traveling on the road.

For convenience in description I have designated such parts of the planter as it is necessary to show as follows:

A is the axle; B, the sill; C, the front cross-piece; D, the rear cross-piece; E, the side rails; F, the seat-standard; G, the seat; H, the bar; I, the center cross-piece; J, the lifting-lever; K, the seed-boxes containing the seed-dropping mechanism; L, the dropper-bar operating the seed-dropper mechanism in the boxes and with which the check-rower mechanism is connected, as I will hereinafter explain; M, the rope-bar pivotally supported at the center of the rear cross-piece, by means of which the rope N is laid off across the field as the planter progresses, and O the tongue.

The check-rower proper consists of the mechanism which I will now describe. The bottom plate A' is suitably secured in a horizontal position on the sill B midway between the seed-boxes K and having its center directly under the dropper-bar L. To the upper surface of this plate is secured a spring $a'$, which acts against a pawl $a$ to engage the pawl with a ratchet $b$ on the under side of the plate B'. When in position, the ratchet-plate B' is parallel to the bottom plate A' and turns on a stud $a^2$ on the bottom plate, there being sufficient space between the plates for the hooked finger C' to enter and engage with the ratchet. The ratchet has six equidistant teeth, as clearly shown in Fig. 5. In the ratchet-plate B' are three radial slots $b^2$, in which the friction-rollers $b'$ are movable to adjust the throw of the ratchet-plate to the stroke of the planter to which it may be attached. The friction-roller $b'$ is attached to the plate B' by means of a bolt $b^3$ passing through the slot $b^2$ in the plate; also passing through a thimble $b^4$, on which the friction-roller turns, so that when the nut on the bolt is tightened the thimble will be clamped against the plate. To adjust the friction-roller it is only necessary to loosen the nut and move the bolt in or out, as may be desired. The bearing-plate $C^2$ is secured in any suitable manner to the under side of the dropper-bar L, directly over the ratchet-plate B', as shown in Fig. 4, so that the friction-rollers on the ratchet-plate will as said plate revolves impinge against the downturned edges of the bearing-plate to impart a reciprocating movement to the dropper-slide. A forked lever D', having curved prongs $d$, is suitably fulcrumed in the planter-tongue O and has pivoted at its upper end a finger C', which engages with the ratchet on the under side of the ratchet-plate B'. Near the lower end of the forked lever is secured one end of a coiled spring E', the other end of said spring being suitably secured to the under side of the planter-tongue O. The check-rope F (or wire, as the case may be) works in the fork of the lever D', and as the planter moves forward a knot on the rope engages with the fork to pull the lever back. This moves the hooked finger C' forward, and the hook on the finger pulling on the ratchet-teeth causes the plate B' to make one-sixth of a revolution in the direction indicated by arrow Fig. 2. When the knot slips off the fork, the spring E' reacts to pull the lower end of the lever back to its first position, where it remains until another knot engages with the fork, and by this means an intermittent rotary motion is imparted to the ratchet-plate B', which, by means of the friction-rollers $b'$ engaging with the bearing-plate $C^2$, gives a reciprocating motion to the dropper-bar L, which actuates the seed-dropping mechanism within the planter-boxes. The forks of the lever D' branch out laterally and are curved upward, so that they may with certainty guide the rope into the fork when the rope is raised.

Suitably secured to the planter-frame is a standard G', on which is fulcrumed a lever H', which extends back within easy reach of the operator. At the forward end of the lever H' is pivoted the rod J', which supports at its lower end the pivoted guide K'. This guide consists of a cylindrical block having a central longitudinal hole through which the rope passes, the ends of said hole being rimmed out to prevent the knots from catching. As a means for pivotally supporting the guide I prefer to use the bolt-head $j$ at the lower end of the rod J', though any other suitable means may be used.

I will now explain the uses of the guide-block K'. When the rope is in position for planting, as shown in Figs. 1 and 2, the guide supports the rope, so that the knots will be certain to engage with the fork. When turning at the end of the row, the operator raises the lever H', which lowers the rod J' and the connected guide K', bringing the guide close to the ground, as shown by dotted lines in Fig. 2. The planter-runners are then raised by downward pressure on the lever J, as shown by dotted lines in Fig. 1, so that in turning the runners will not catch on the rope. While the planter is turning the guide remains on the rope and, turning on its pivot, adapts itself to the changed position of the planter.

When ready to resume planting, the operator raises the guide by pressing down on the lever H' and hooks the lever under the projecting lug $g'$ on the standard G' to hold the lever in place until it is necessary to again lower the guide. To the under side of the tongue O and in front of the guide K' is secured the fender L'. (Clearly shown in Figs. 8 and 9.) This fender has at its front an opening through which the rope passes, and has on either side wings which ward off stalks or other rubbish and prevent damage to or obstruction of the mechanism.

At the center of the axle A is suitably supported a grooved pulley M', in which the rope runs. At each end of the back cross-piece D is a similar pulley $m'$, and at the outer end of the extension-bar M is a similar pulley $m^2$. In operation one end of the rope N is secured to a pin $N^2$ on the side of the field opposite to that at which the planting is begun. The rope lies under the center of the machine, extends around the pulleys M' $m'$, parallel to the extension-bar M, around the pulley $m^2$ at the end of the bar, and has its other end secured to a pin N' at the place of beginning. The transverse distance between that part of the rope N which is secured to the pin $N^2$ and the extension of that part which is secured to the pin N', as indicated by the dotted lines, is equal to one and one-half times the width between the rows. It is obvious, then, that as the planter moves forward the rope passing over the pulley $m^2$ at the end of the bar M will be laid off in a straight line and in such position as to lie under the center of the planter as it comes back across the field.

When one row is planted and the planter is turned to start back across the field, the extension-bar M is also turned so as to lay off the rope on the same side as before, and so on until the field is planted. The rope may be laid on whichever side of the planter is most convenient.

I do not broadly claim a rope-guide having a longitudinal hole and rimmed-out ends, but restrict myself to a guide on the under side of the planter-frame pivotally supported, so as to adapt itself to the position of the planter relative to the rope in turning, also serving as a means by which the rope may be raised or lowered.

What I claim as my invention, and desire to secure by Letters Patent, is—

1. In a center-movement check-rower, the combination of a bottom plate attachable to the planter-frame, an intermittently-rotating ratchet-plate supported on the bottom plate, and friction-rollers on the ratchet-plate engaging with a bearing-plate attachable to the dropper-bar, substantially as shown and described, and for the purpose stated.

2. A ratchet-plate for a center-movement check-rower, consisting of a disk having on its under side a ratchet and having radial slots in which are adjustable friction-rollers, in combination with the bottom plate attachable to the planter-frame, the bearing-plate attachable to the dropper-bar, the forked lever fulcrumed on the planter-frame, the finger engaging with the ratchet-plate, and the knotted rope engaging with the forked lever, substantially as shown and described, and for the purpose stated.

3. In a center-movement check-rower, the bottom plate having a stud on which the ratchet-plate turns, having a pawl pivoted on its upper surface, and having a spring acting against said pawl, in combination with an intermittently-rotating ratchet-plate, a forked lever, a knotted rope, and a hooked pawl connecting said lever with said ratchet-plate, substantially as shown and described, and for the purpose stated.

4. A rope-guide for check-rowers, consisting of a block having a longitudinal hole with rimmed-out ends and pivotally supported underneath the planter-frame, substantially as set forth, and for the purpose stated.

5. In a check-rower, the combination of a rope-guide pivotally supported underneath the planter-frame with the mechanism for raising and lowering said guide adapted to engage and disengage the dropping mechanism and carrying the operating check-rope out of the way of the planter-runners, substantially as shown and described, and for the purpose stated.

6. A fender for check-rowers, having at its front an opening and on each side thereof wings, substantially as shown and described, and for the purpose stated.

7. In a check-rower, the combination of a forked lever fulcrumed on and extending below the planter-frame, provided at its lower end with upwardly-curved prongs and carrying at its upper end a hooked pawl which engages with and rotates a ratchet-plate, substantially as set forth, and for the purpose stated.

8. In a check-rower, the knotted rope operating under the center of the planter-frame, passing through a vertically-adjustable guide and engaging with a forked lever connected with the dropping mechanism of the planter, substantially as shown and described, and for the purpose stated.

9. In a check-rower, the combination of the extension-bar pivotally attachable to the center of the planter and having at its outer end a pulley, the knotted check-rope secured at both ends and passing centrally under the planter, passing around pulleys on the planter-frame, and extending laterally parallel to and running around the pulley on said bar, the forked lever fulcrumed on the planter-frame, the bottom plate on the planter-frame, the intermittently-rotating ratchet-plate actuated by the forked lever and engaging with a bearing-plate on the dropper-bar, the standard supported on the planter-frame, the lever fulcrumed on the standard, the bar pivoted to the lever, the guide pivotally supported on the bar, and the fender supported on the planter-frame, substantially as shown and described, and for the purpose stated.

10. In a check-rower, the combination of the knotted rope, the forked lever fulcrumed on the planter-frame, the bottom plate secured on the planter-frame, the intermittently-rotating ratchet-plate actuated by the forked lever and engaging with the bearing-plate on the dropper-bar, the standard supported on the planter-frame, the lever fulcrumed on the standard, the bar pivoted to the lever, the guide pivotally supported on the bar, and the fender supported on the planter-frame, substantially as shown and described, and for the purpose stated.

FRANK P. RICHARDS.

Witnesses:
J. G. SEAMAN,
FRANK B. GREENWOOD.